United States Patent [19]

Arold

[11] Patent Number: 4,769,987
[45] Date of Patent: Sep. 13, 1988

[54] FLYWHEEL ROTARY ENGINE

[76] Inventor: Frank Arold, 800 W. Remington, Saginaw, Mich. 48602

[21] Appl. No.: 2,174

[22] Filed: Jan. 12, 1987

[51] Int. Cl.$^4$ .................... F16H 43/00; F01D 1/18
[52] U.S. Cl. ............................. 60/325; 415/76; 415/80
[58] Field of Search .................... 415/80–82, 415/121 R, 122 R, 76, 71; 60/325, 415

[56] References Cited

U.S. PATENT DOCUMENTS

| 1,329,626 | 2/1920 | Oman | 415/80 |
| 4,466,245 | 8/1984 | Arold | 415/80 X |

FOREIGN PATENT DOCUMENTS

| 21218 | 7/1920 | France | 415/80 |
| 245463 | 6/1926 | Italy | 415/80 |
| 56-56905 | 5/1981 | Japan | 415/80 |
| 655897 | 8/1951 | United Kingdom | 415/80 |

Primary Examiner—Robert E. Garrett
Assistant Examiner—Joseph M. Pitko
Attorney, Agent, or Firm—Rhodes and Boller

[57] ABSTRACT

A flywheel rotary engine power plant comprises a flywheel having internal passages through which power fluid is conducted to impart rotation to the flywheel about an axis. The flywheel is mounted on a journaled shaft and the pressure fluid is conducted through the shaft and introduced into a central region of the flywheel. The passages extend generally radially outwardly from the center of the flywheel. Each passage comprises a straight entrance section which merges into a single turn helix section of approximately 315° extent and the helix section in turn merges into a straight exit section which extends to the passage outlet at the perimeter of the flywheel. The exiting fluid is directed against a vaned casing surrounding the perimeter of the flywheel to add a jet-propulsion effect. The propulsive force is developed by the action of the fluid on the single turn helix chambers and the jet-propulsion effect.

7 Claims, 2 Drawing Sheets

FLYWHEEL ROTARY ENGINE

BACKGROUND AND SUMMARY OF THE INVENTION

This invention relates generally to power plants, and more specifically it relates to a power plant having a flywheel which is effective to convert the energy of power fluid into rotational energy for delivery by an output shaft. The flywheel is constructed in a new and unique way to convert the fluid's energy into rotational energy.

Many sources attribute design of the world's first engine to the Roman inventor Hero. Hero's engine comprises a hollow body supported for rotation about an axis with power fluid (steam) being generated within the hollow body and discharged via jets at the periphery of the body. The jet discharge imparts rotation to the hollow body about its axis. The Hero engine is capable of developing great turning speed but with very little power. Attempts to develop this engine into a useful power plant must be regarded as generally unsuccessful as evidenced by lack of such power plants in commercial applications.

Other forms of power plants have been developed over the evolutionary history of such devices but many of these possess relatively low efficiencies in terms of horsepower output versus energy input. For example, the internal combustion engine which is used widely for various purposes, particularly in the automotive field, is a very inefficient source of energy utilization. While large forces are developed at the instant of combustion, they rapidly diminish on the piston's downstroke. Such engines are often water cooled and have elaborate cooling systems including radiators at which substantial amounts of waste heat are rejected. These engines also embody elaborate lubrication systems to minimize the effects of friction and wear. Furthermore, in order to minimize the effects of pollution from these engines to atmosphere, the engines are often deliberately operated at less than their already inefficient maximum efficiency. Additional pollution control equipment is associated with these engines to produce this result, and they are wasteful of fuel.

The invention of my own prior U.S. Pat. No. 4,466,245 is an improvement in a power plant having a fluid powered flywheel.

The invention of this new patent application involves further improvements in fluid powered power plants having flywheels through which fluid is conducted. The invention is capable of improved efficiencies of operation, and it is non-polluting as well.

Features which are embodied in the flywheel of this invention include factors relating to leverage, centrifugal force, Bernoulli's principle, jet propulsion, weight, inertia, speed and pressurized fluid.

The flywheel is constructed and arranged with new and unique internal passages having chambers upon which the fluid is effective.

In the disclosed embodiment of the invention, the power fluid flows in a closed circuit between a reservoir chamber and the flywheel. Power fluid in the reservoir is maintained under pressure through the weight of fluid itself, and/or a captive pressurized gas. The preferred form of reservoir comprises a gas-over-liquid system wherein liquid is the power fluid and the gas is the powering fluid. The reservoir is closed so as to have the pressurized gas over the liquid thereby pressurizing the liquid to provide the power force. Maintenance of gas pressure can be by means of an air compressor or other device if needed.

The flywheel is journaled for rotation about its axis by a journal shaft containing a passage through which the pressurized liquid is conducted to the flywheel. The supply line from the reservoir to the journal shaft terminates in a rotary coupling at one end of the journal shaft so that the pressurized liquid can be supplied to the rotating flywheel.

The journal shaft comprises holes through its sidewall to communicate to internal passages having chambers within the flywheel. Each chamber is formed as essentially a single turn helix in the corresponding passage with the chambers' transverse cross sectional area first increasing and then decreasing around the helix. The pressurized liquid moves tangentially around the chambers to outlets which are the exit points of the passages located at the outer periphery of the flywheel. Each outlet is disposed at an intersecting angle to a radial so that the exiting fluid adds a jet propulsion effect. The jets react against an outer casing surrounding the perimeter of the flywheel. This outer casing is part of an enclosed system which serves to collect the fluid which is jet-discharged from the periphery of the flywheel. This outer casing may also include vanes against which the exiting fluid acts.

As part of the collection system, an impeller may be coupled with the flywheel to be rotated by the flywheel. The impeller impels the collected liquid through a return line back to the reservoir. Thus, a continuous circulation of liquid through the system is effective to power the output shaft coupled to the flywheel via which useful energy is delivered. The source of energy is the pressurized liquid which is kept pressurized by the gaseous pressure within the reservoir chamber. The invention is of a non-polluting nature and of improved efficiency.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
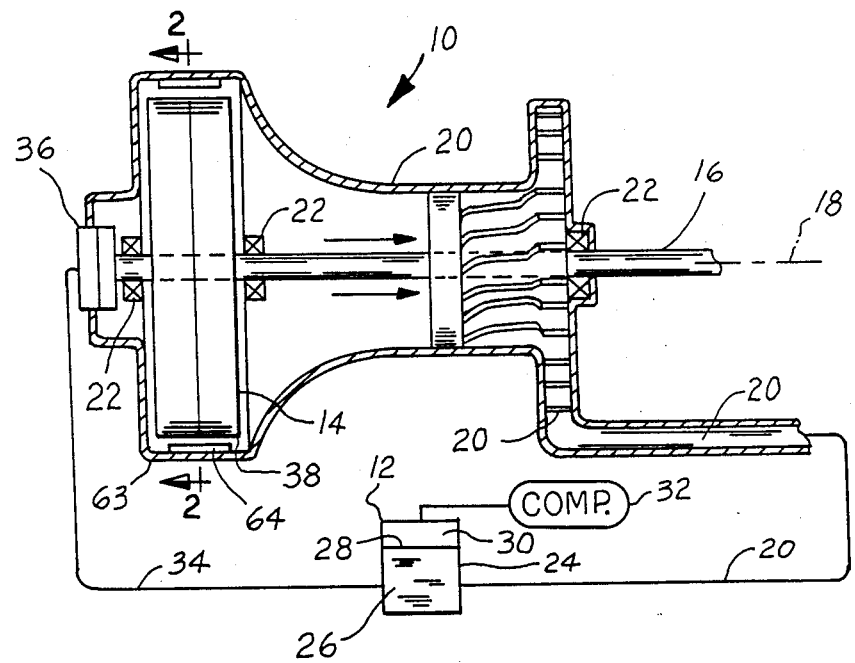
FIG. 1 is a semi-schematic representation of a preferred embodiment of the invention.

The drawings illustrate a power plant 10 embodying principles of the present invention. Looking first to FIG. 1 the reader will see that power plant 10 comprises a power fluid supply system 12, a flywheel 14, and a shaft 16. Briefly, the power fluid supply system supplies power to the flywheel causing the flywheel to rotate about its journal axis 18 thereby rotating shaft 16. The power plant serves to convert the energy of the power fluid into rotational energy which can be delivered by shaft 16 to any sort of utilization device requiring rotational input power. Since the power plant of this invention may be used to power different types of devices, no particular utilization device is shown coupled with shaft 16. FIG. 1 shows shaft 16 to constitute both the journal shaft for flywheel 14 and the output shaft for the power plant. The illustrated embodiment also shows both flywheel 14 and output shaft 16 coaxial with axis 18.

Also associated with the power plant in FIG. 1 is a system 20 via which fluid is re-circulated through the power system and details of this system 20 will be explained later on.

FIG. 1 shows the flywheel mounted on shaft 16 which is journaled by suitable journal bearing supports which are indicated generally by the reference numerals 22. These journal bearing supports are conventional, and the illustrated arrangement is not intended to denote any particular configuration. The journal bearing supports are designed in accordance with conventional procedures to suitably journal the shaft for the speed and load capacities of the power plant. Also the one-piece showing of shaft 16 in FIG. 1 is not intended to limit possible constructions and arrangements, it being understood that multi-piece shafts suitably coupled could be used.

The power fluid supply system 12 includes a reservoir, or accumulator 24, which is of conventional construction. A suitable construction is a gas-over-liquid type system in which the power fluid for the power plant is a liquid 26, such as water, which fills the chamber 24 to a certain level indicated by the reference numeral 28. This leaves a headspace 30 for a gas under pressure, such as air. The pressure of the gas on the liquid is effective to pressurize the liquid so that it becomes a pressurized power fluid. It would also be possible to strategically position the reservoir in relation to the flywheel to take advantage of the hydraulic pressure due to weight of the liquid itself. This would be done by locating the reservoir such that the level 28 is located above the level of the point at which it is effective on the flywheel. Pressurized gas can be maintained by any suitable means, if necessary, such as by a compressor 32.

A liquid supply line 34 extends from the liquid zone of reservoir 24 to a rotary coupling 36 which is coaxially mounted at one end of the shaft adjacent flywheel 14. This coupling has a stationary part which connects to line 34 and a rotating part which connects to the rotating shaft. The reason for utilizing a rotary coupling 36 is that supply line 34 will be stationarily mounted adjacent the journaled rotating flywheel. The shaft 16 has an axial passage from coupling 36 to flywheel 14 through which the power fluid from line 34 passes to a central region of the flywheel. As will be seen from the ensuing detailed description, the power fluid is introduced into the central region of the flywheel and is conducted through internal structure of the flywheel to exhaust ports to cause the flywheel to rotate and thereby power for the shaft.

It is now appropriate to turn to a detailed consideration of exemplary internal construction of flywheel 14.

Flywheel 14 comprises a circular disc body structure 38 being an internal construction which comprises a series of passages 40 which are organized and arranged in a new and unique manner.

The shaft 16 has holes in its sidewall to communicate the internal shaft passage with the flywheel passages 40. There are a total of eight such passages 40 arranged in a symmetrical pattern on the flywheel. In other words, each passage is 45° from the two immediately circumferentially adjacent ones.

Figure 2:
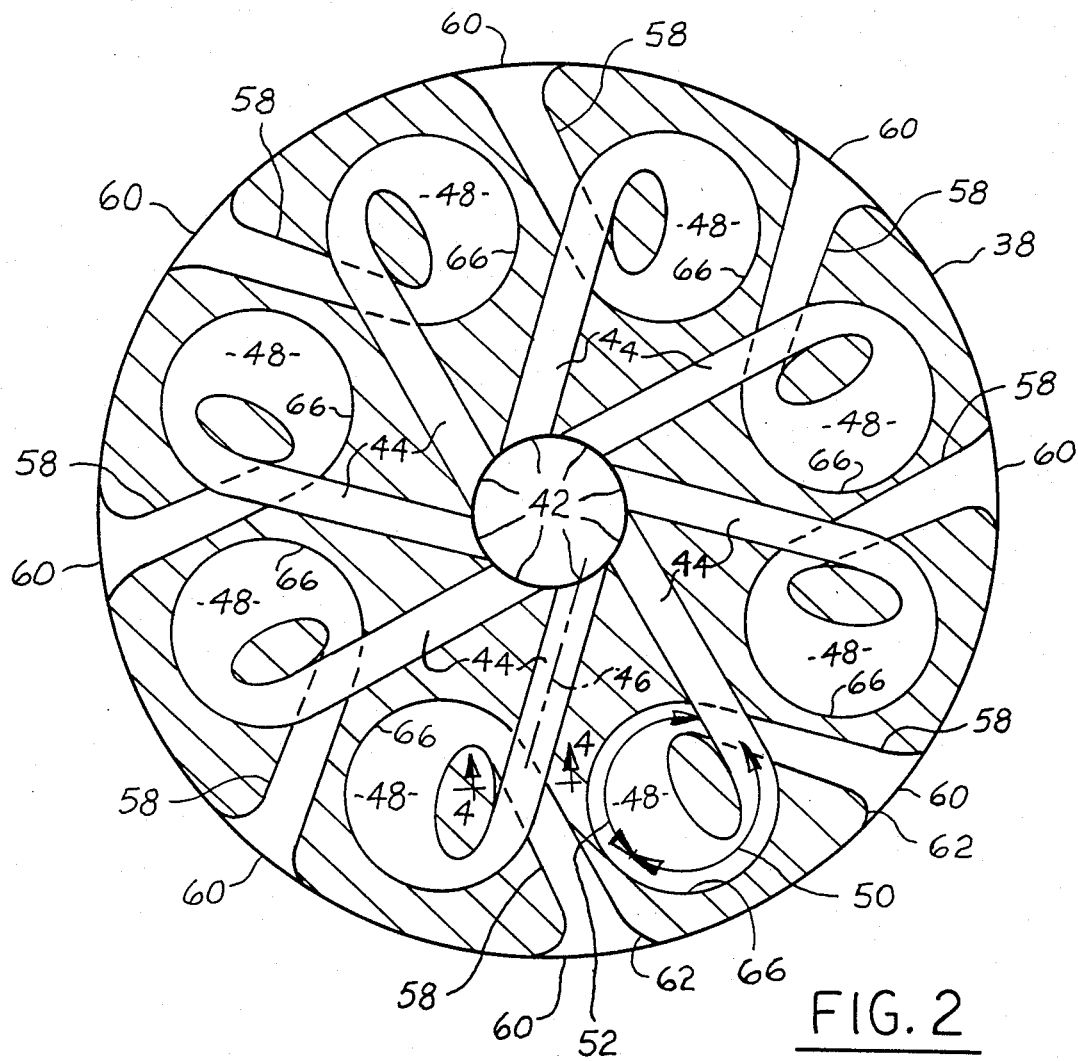
FIG. 2 is an enlarged sectional view taken generally in the direction of arrows 2—2 in FIG. 1.

Each passage 40 has an entrance 42 leading to a straight section 44 of generally uniform transverse cross section. The straight section's axis 46 does not pass through the shaft axis 18, but rather is on a tangent to an imaginary circle (not shown in the drawings) which is concentric with the shaft axis. Hence, although each straight section 44 has a general radial extent on the flywheel, it does not lie on a true radial. Moreover, although the sections 44 appear in FIG. 2 to lie in the plane of the drawing Figure, the sections may actually have their axes inclined to the plane of the Figure at some small angle.

Each straight section 44 extends roughly two-thirds to three-quarters of the way from the shaft 16 to the outer perimeter of the flywheel 14. At the outer termination of the straight section 44, the passage 40 turns into a chamber 48. Each chamber 48 forms a continuation of the corresponding passage 40, but constitutes a change in shape of the passage for the purpose of developing power from the fluid passing through the passage.

Figure 3:
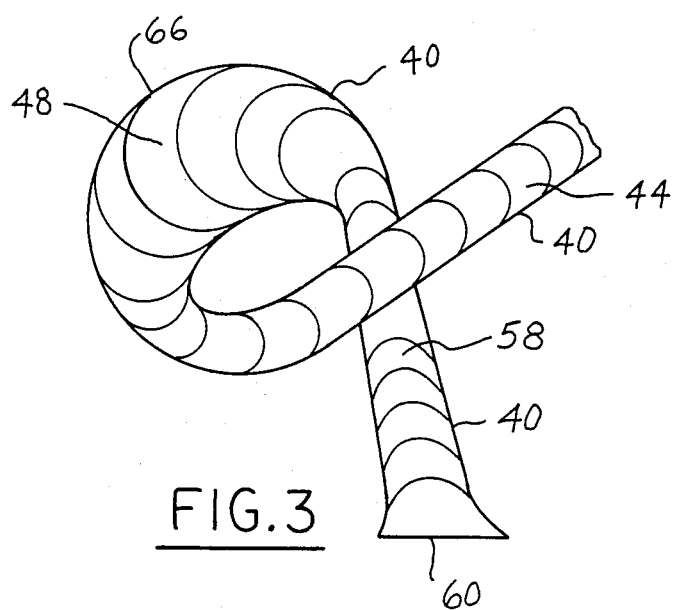
FIG. 3 is a diagrammatic view for explaining certain aspects of the invention.
Figure 4:
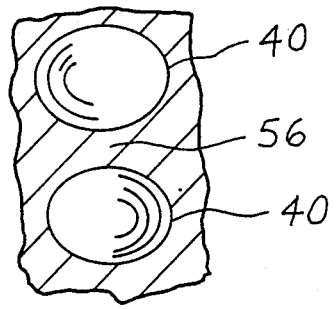
FIG. 4 is a sectional view taken in the direction of arrows 4—4 in FIG. 2.

Each chamber 48 is formed as essentially a single turn helix. Over an initial portion of the single turn helix forming the chamber 48, as represented by the arrow 50, the generally circular transverse cross section progressively increases. This is roughly for the first half of the length of the helix. Over a final portion of the helix, the transverse cross section progressively decreases, as portrayed by the arrow 52. The two arrows span a combined angle of approximately 315°. The shapes are portrayed in FIG. 3 which illustrates representative arcs of the cross section. The pitch of the helix is such that there is an adequate wall 56, as viewed in FIG. 4, at the point where the helix appears to cross back under itself.

From the end of the helix, the passage 40 has a generally straight section 58 which extends to an outlet 60 in the outer perimeter of the flywheel 14. The initial portion of each straight section 58 has a slight taper which increases into a larger flare 62 at the outlet. The angle between the sections 44 and 58 is approximately 135°, as viewed in FIG. 2, and the sections 58 may be at a small angle to the plane of the Figure, in the same manner as the sections 44.

An outer casing 63 (FIG. 1) surrounds the flywheel and is shown to contain a series of vanes 64 to form reaction surfaces for the fluid which exits the outlets 60 from the passages 40.

In operation of the power plant, fluid under pressure enters the passage entrances 42 moving along the straight sections 44. As fluid enters the chambers 48, it is redirected along the helical path formed by the helix and acts against the outer wall region 66 of the chamber as it moves along the helix. The fluid acts with centrifugal force against region 66. During movement along the first half of the helix, arrow 50, the velocity will slow down as the cross section increases, but over the second half of the helix, arrow 52, the velocity will increase due to the decreasing cross section. This is an application of Bernoulli's principle. The force effect of this fluid acting on the wall region 66 is at a radial distance from the shaft axis and the effects on each of the eight chambers 42 are additive.

After traversing the helical chambers 48, the fluid passes generally straight through the straight sections 58 and against the casing 63 and its vanes 64. The direction of exit is advantageous in a sense which also adds to the turning effect, contributing further to the effects of the fluid on the chambers' walls 66. Accordingly, these effects add to a total propulsive force of substantial power rotating the flywheel 14, and hence the shaft 16, whereby power can be extracted by the utilization device which is coupled to the shaft.

The invention possesses the advantages which have been described above and are again summarized as follows: leverage, referring to the action of the fluid along the wall region 66 of each chamber 48 at a radial distance from the shaft axis 18; centrifugal force of the fluid as it traverses the wall region 66; application of Bernoulli's principle for creating the velocity change and hence a corresponding pressure change as the fluid passes across the wall region 66; jet propulsion, referring to the discharge of fluid from the outlets against the casing 63 and vanes 64; multiple chambers, eight chambers in the illustrated example; and the characteristics of both the flywheel and the fluid itself meaning the weight or inertia of the flywheel and a substantial prepressurized fluid, on the order of 100 PSI, for example.

By directing a continuous flow of fluid to the flywheel, the flywheel can have a substantially constant power output at all times, unlike an internal combustion engine in which power is exerted by sequential explosions in the various combustion chambers. This engine of my invention offers very significant advantages over an internal combustion engine because of the much smaller number of moving parts, its simpler construction, more constant power output, and smoother operation. It is also non-polluting. Of course, the power output can be varied by varying the pressure and flow rate of the power fluid being introduced into the flywheel.

Because power output can be developed only by resistance, the flywheel should have a sufficient mass itself. It is possible that even a second flywheel could be mounted on the shaft. The vanes around the inside of the casing also provide resistance as the fluid exits. Using water as the power fluid provides the advantage of adding additional weight of the moving liquid itself although other types of fluid can be used to power the engine. The particular characteristics of any engine will depend upon the size and mass and shape of the flywheel and the size, shape and number of passages and chambers through which the fluid passes. It will also depend upon the manner in which the casing and its vanes are arranged in relation to the outer perimeter of the flywheel to receive the jet propulsion discharge from the passage outlets.

For its size, shape and weight, the invention can have a greater efficiency than an internal combustion engine and therefore is capable of developing a greater power output. Of course, additional devices may be associated with the power plant, such as gearing, or a transmission, for speed and torque change purposes. Moreover, the exact orientation of the power plant is not deemed to be critical. For example, the axis of the shaft can be horizontal or vertical. The invention may be practiced through the use of conventional principles of engineering and physics to size the components for desired power applications. For example, the illustrated construction is considered to represent a flywheel having a 14 inch diameter.

While a preferred embodiment of the invention has been disclosed, it is to be appreciated that principles are applicable to other embodiments.

What is claimed is:

1. A power plant comprising a source of power fluid, a rotary output shaft, and means for converting the energy of the power fluid into rotational energy for delivery by said output shaft comprising a flywheel journaled for rotation about an axis, means for introducing power fluid to a central region of said flywheel, said flywheel comprising a body, means defining a plurality of passages within said body spaced circumferentially about said axis, an entrance for communicating each passage to the power fluid at the central region of said flywheel, an outlet for each passage via which power fluid is exhausted, each outlet being spaced radially outwardly of the corresponding entrance and oriented to produce a jet effect with resulting flywheel rotation when power fluid is exhausted therefrom, each passage comprising a straight entrance section which extends radially outwardly to merge into a chamber that is in the form of a single turn helix section, said single turn helix section having an initial portion of progressively increasing cross section and a final portion of progressively decreasing cross section, each passage further comprising an outlet section extending from its single turn helix section to its outlet, the extent of each single turn helix section and the organization and arrangement of the associated entrance and outlet sections being such that, as viewed axially of the flywheel, each passage appears to cross itself in such a manner that the corresponding helix section is disposed to one side of an imaginary radial from said axis to the crossing point and the corresponding outlet is disposed to the other side of the same radial.

2. A power plant as set forth in claim 1 in which said passages and chambers are organized and arranged in a symmetrically manner around the flywheel.

3. A power plant as set forth in claim 2 in which there are eight such passages and chambers at 45° intervals around the flywheel.

4. A power plant as set forth in claim 1 in which each single turn helix section has an extent of just slightly less than a full 360°.

5. A power plant as set forth in claim 4 in which the initial and final portions of each single turn helix are approximately equal to each other.

6. A power plant as set forth in claim 5 in which the entrance section has its axis along a line which is tangent to an imaginary circle concentric with the axis of rotation.

7. A power plant comprising a source of power fluid, a rotary output shaft, and means for converting the energy of the power fluid into rotational energy for delivery by said output shaft comprising a flywheel journaled for rotation about an axis, means for introducing power fluid to a central region of said flywheel, said flywheel comprising a body, means defining a plurality of passages within said body spaced circumferentially about said axis, an entrance for communicating each passage to the power fluid at the central region of said flywheel, an outlet for each passage via which power fluid is exhausted, each outlet being spaced radially outwardly of the corresponding entrance and oriented to produce a jet effect with resulting flywheel rotation when power fluid is exhausted therefrom, each passage comprising a straight entrance section which extends radially outwardly to merge into a chamber that is in the form of a single turn helix section, said single turn helix section having an initial portion of progressively increasing cross section and a final portion of progressively decreasing cross section, each passage further comprising an outlet section extending from its single turn helix section to its outlet, in which the initial and final portions of each chamber have a total extent slightly less than a full 360° and in each chamber the extent of the initial portion is essentially equal to the extent of the final portion around the helix, and the extent of the helix is approximately 315°.

* * * * *